WHEEL CHAIR

Original Filed Feb. 14, 1969 5 Sheets-Sheet 1

INVENTOR
RODVINON I. ZAMOTIN

BY Larson and Taylor
ATTORNEYS

WHEEL CHAIR

Original Filed Feb. 14, 1969 5 Sheets-Sheet 2

INVENTOR
RODVINON I. ZAMOTIN
BY Parson and Taylor
ATTORNEYS

INVENTOR
RODVINON I. ZAMOTIN
BY Larson and Taylor
ATTORNEYS

INVENTORS
RODVINON I. ZAMOTIN
BY Larson and Taylor
ATTORNEYS

WHEEL CHAIR

Original Filed Feb. 14, 1969 5 Sheets-Sheet 5

INVENTORS
RODVINON I. ZAMOTIN

BY Larson and Taylor
ATTORNEYS

United States Patent Office

Re. 28,256
Reissued Nov. 26, 1974

28,256
WHEEL CHAIR

Rodvinon I. Zamotin, P.O. Box 721,
Miami Springs, Fla. 33160

Original No. 3,602,522, dated Aug. 31, 1971, Ser. No. 799,411, Feb. 14, 1969. Application for reissue Apr. 9, 1973, Ser. No. 349,469
Int. Cl. A61g *5/00*
U.S. Cl. 280—5.22 17 Claims

Matter enclosed in heavy brackets [ ] appears in the original patent but forms no part of this reissue specification; matter printed in italics indicates the additions made by reissue.

ABSTRACT OF THE DISCLOSURE

A self-propelled wheel chair having two sets of endless belts and retractable wheels for ascending and descending irregular inclined surfaces such as stairs. A flip-decelerating shock absorber using standard hydraulic means eases the movement over an edge from a level surface to a downwardly inclined surface. The long primary endless belts are used for ascending and descending stairs, and the shorter, secondary belts mounted rearwardly of the primary belts and drivingly engaged therewith, are used for climbing and descending curbs and the like. An improved arrangement is provided for retracting the main wheels. An improved drive is provided between the main wheels and the primary belts, and an improved clutch permits selective driving engagement and disengagement between the main wheels and the primary belts.

BACKGROUND

This invention relates to wheel chairs. More particularly, this invention relates to a self-propelled wheel chair capable of ascending and descending irregular inclined surfaces such as steps, curbstones etc. as well as travelling on flat, or substantially flat surfaces.

There are many individuals who must spend considerable time without the use of their legs while recuperating from physical injury and many more individuals who are permanently unable to walk. The wheel chair provides a relatively inexpensive device to aid such people to travel about by themselves and thereby regain a measure of normal mobility. Thus, the invalid is enabled, by using his arms and hands, to travel about on smooth level surfaces and on smooth gentle slopes. In order to traverse steep slopes, it is necessary, with the ordinary wheel chair, to enlist the aid of a helper to either push the chair from behind or restrain the chair from rapidly descending a steep slope. To obviate the need of a helper, specialized expensive motorized vehicles have been developed whereby motor power can be applied to the wheels to drive the chair. As it is necessary, to enter and leave most homes and buildings, that the wheel chair traverse steps, it has been necessary to provide ramps for the use of people confined to wheel chairs. It is now common to observe such ramps provided in private homes and public buildings and a great many new well planned public buildings include such ramps in their original design. There remain, however, a large majority of buildings with no such provision and in addition, there are many obstacles such as curbstones which are all but impossible to traverse, unaided, in an ordinary wheel chair. And it is further impossible to traverse an ordinary flight of steps, even with aid. In such situations the whole chair must be lifted and carried by two persons.

A wheel chair which overcomes at least some of the aforementioned disadvantages is disclosed and claimed in my previous U.S. Pat. No. 3,259,396, patented July 5, 1966. My said previous patent is incorporated by reference in this application, not only for its teaching of the basic concepts of a retractable wheel, endless belt wheel chair, but also for some of the more specific features such as the construction of the endless belt, the construction of the clutches and the construction of the means for retracting and extending the rear wheels.

Although the apparatus shown in my said previous patent represents a significant advancement in the art, certain problems have arisen in practice.

One of these problems concerned the movement of the wheel chair over an edge such as from a level surface onto a staircase to commence descending the staircase. With my previous arrangement, this descending movement is carried out by first retracting the rear wheels so that the wheel chair rests on the rear portion of the endless belt. The wheel chair is then moved by means of these endless belts outwardly from the level surface over the descending surface. The chair retains its original orientation during the forward movement until the center of gravity passes the edge of the level surface and is also over the inclined surface, at which time the whole chair swings about the edge until the endless belts contact the inclined surface. However, this procedure has been less than satisfactory since the said swinging movement is often very sudden, and indeed almost frightening since it often appears that the chair could tumble down the incline. Therefor, there exists a need for a means to facilitate movement of an endless belt-type wheel chair from a level surface over an edge to a downwardly inclined surface.

Another problem in the prior art is the task of climbing a curb. One means for accomplishing this purpose is shown in my said patent. However, the means shown therein is often difficult to maneuver. Thus, there exists a continuing need for new and improved means for negotiating curbs.

In addition, of course, there exists a continuing need for improving various parts of the apparatus, including, for example, the means for retracting and lowering the main wheels, the means for driving the endless belt from the main wheels and the clutch means for selectively drivingly engaging the endless wheels with the main wheels.

SUMMARY OF THE INVENTION

Thus, a purpose of this invention is to provide a new and improved wheel chair of the type capable of both operating on a flat surface and also negotiating irregular inclines such as curbs and stairs.

In accordance with this purpose of the invention there is provided, in a wheel chair of the type described, a shock absorbing apparatus for eliminating the sudden drop which has occurred heretofore as the center of gravity of the wheel chair passed over the edge of a flat surface onto a downwardly inclined surface. In accordance with another feature of the invention there is provided a second endless belt, preferably in driving engagement with the first endless belt, and mounted with respect to the rear wheels such that the second endless belt rather than the rear wheels engages the edge of the curb during both climbing and descending curbs.

In accordance with another feature of the invention there is provided an improved means for retracting and lowering the main wheels. This arrangement includes a lever which, through half of its movement, causes slight movement of the main wheels off the ground (just enough to clear the endless belt), and through the other half of its movement raises the wheels a substantial distance above the level at which the endless belt engages the ground.

In accordance with another feature of the invention there is provided an improved drive means for driving the endless belt (or belts), by turning the main wheels.

In particular, this new and improved driving engagement includes providing internal teeth on the drive pulley of the endless belt, and arranging a plurality of spur gears within this driving pulley and in engagement with the internal teeth. One of these spur gears may have mounted on its shaft a sprocket with a chain for receiving the drive from the main wheels. This arrangement permits a three to one gear reduction, thereby increasing the mechanical advantage by decreasing the amount of work necessary to move the wheel chair. Another one of these internal spur gears in engagement with the internal teeth on the drive pulley includes a sprocket with a chain for driving the said second endless belt. The third spur gear includes a ratchet and constitutes a means for permitting movement of the driving pulley in forward or reverse.

In accordance with another feature of the invention there is provided an improved simplified clutch means for selectively placing the main wheels into or out of driving engagement with the endless belt.

Thus, it is a purpose of this invention to provide a new and improved wheel chair of the type described for ascending and descending irregular inclined surfaces as well as for travelling on a substantially flat surface.

It is another object of this invention to provide a new and improved means for facilitating movement of a wheel chair of the type dsecribed from a level surface over an edge onto a downwardly inclined surface.

Another object of this invention is to provide a new and improved means for retracting and lowering the main wheels.

It is another object of this invention to provide, in a wheel chair of the type described, a new and improved means for driving the endless belt from the main wheels.

It is another object of this invention to provide a simplified clutch arrangement for selectively placing the main wheels into or out of driving engagement with the endless belt.

Other objects and the attendant advantages of the present invention will become apparent from the detailed description to follow together with the accompanying drawings.

BRIEF SUMMARY OF THE DRAWINGS

The wheel chair of the present invention comprises two symmetrical side parts containing the various mechanical features of the invention and a foldable flexible center part including the seat and back connecting these two main side parts. Therefore, to simplify the discussion of the invention only one of these main side parts will be illustrated in detail. For an overall perspective view of a wheel chair of the present type, and for an illustration of the foldable flexible back and seat between the two sides, reference is made to my said previous U.S. Pat. No. 3,259,396.

In the Drawings.

DETAILED DESCRIPTION OF THE PREFERRED EMBODIMENT

Figure 1:
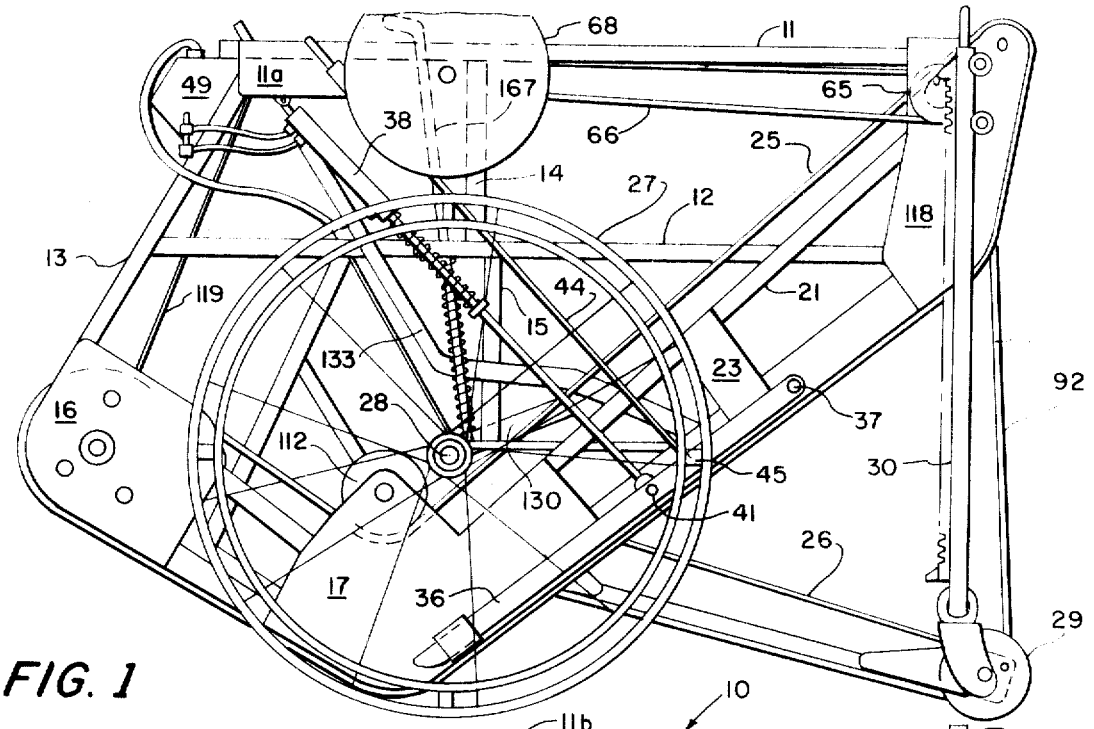
FIG. 1 is an outside elevational view of the left side frame of a wheel chair constructed in accordance with the present invention.

Referring now to the drawings, FIGS 1–11 all relate to the left side frame of the wheel chair, it being understood that the right side frame of the wheel chair is symmetrical with the left side and is connected thereto by means of a foldable seat and back section as shown in my previous U.S. Pat. No. 3,259,396. Like elements are represented by like numerals throughout all of the figures.

FIG. 1 illustrates the complete left side frame of the wheel chair, showing all of the elements of the preferred embodiment. However, in the subsequent views various parts of the preferred embodiments are omitted for purposes of clarity.

Figure 2:
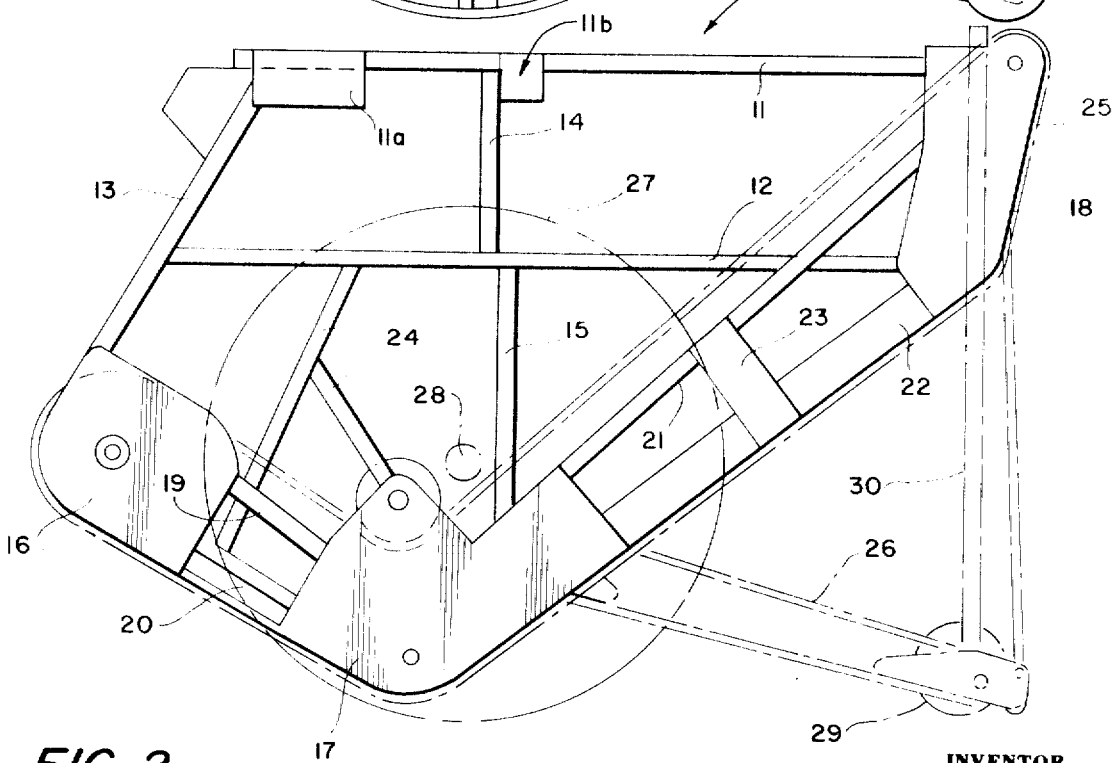
FIG. 2 is a view similar to FIG. 1, but showing, in solid lines, only fixed frame elements of the wheel chair.

FIG. 2 shows, in solid lines, those elements which constitute the fixed rigid parts of the left side frame 10. This fixed frame includes a horizontal arm rest bar 11 having a downwardly extending front part **11*a*. Parallel to the bar 11 is a central horizontal bar 12 connected to the bar 11 by a front bar 13 and an upper central vertical bar 14. The lower and rearward part of the side frame, as shown in FIG. 2, constitute the guide parts for guiding the endless belt. This guide part comprises a pair of front plates 16, a pair of central plates 17 and a pair of rear plates 18. Suitable pulleys and drive wheels are located between the pair of plates 16, the pair of plates 17 and the pair of plates 18 for driving and guiding the main endless belt. A front upper guide rail 19 and a front lower guide rail 20 extend between and connect the sideplates 16 and the sideplates 17. Similarly, a rear upper guide rail 21 and rear lower guide rail 22 extend between and connect the central plates 17 and the rear plates 18. A connecting piece 23 extends between and is connected to the rails 21 and 22. A lower central vertical bar 15 extends from the bar 12 to the bar 21. And finally, a pair of fixed bars 24, extending downwardly from the central horizontal bar 12**, from a frame onto which a foot pedal is mounted. This particular feature is shown in greater detail in FIG. 9.

For placing the fixed rigid parts into proper context, there is also shown in FIG. 2, in dotted lines, the main moving parts of the wheel chair, including the main endless belt 25, a crawler belt 26, the main wheel 27 of the wheel chair (shown in its downward position) the central shaft 28 of the wheel 27, the back wheel 29 and the vertically movable rear leg 30 to which the back wheel 29 is attached.

As explained in detail in my said previous patent, and as explained in greater detail below, in order to ascend a flight of stairs, the operator backs up to the flight and raises the rear leg 30 and the entire rear leg structure upwardly so that the portion of the endless belt beneath the rear lower guide rail 22 engages the stairs. As explained in greater detail below, the entire structure associated with the crawler belt 26 is connected to the rear leg and the rear wheel structure such that when the rear leg is raised, the crawler structure is also raised. As a result, as in the case of my previous patent, the portion of the endless belt beneath the guide rail 22 engages the flight of steps for ascending the said flight. Similarly, as explained in my said previous patent and as explained in greater detail below, to descend a flight of stairs, the operator approaches the stairs with the rear wheels fully retracted and with the wheel chair resting on the portion of the endless belt beneath guide rail 22. The wheel chair is then moved slowly, and horizontally, over the stairs themselves until the center of gravity passes over the edge.

At this point the chair tips forward until the position of the belt beneath guide rail 22 engages the downwardly inclined surface such as the edges of the steps.

However, until now this procedure for advancing over the top of the incline has had at least one substantial disadvantage. In practice, the "tipping over" motion is not gradual. Rather, there is a sudden drop which is almost frightening. If the incline is great enough, one almost obtains the feeling that the chair will continue to fall forward, tumbling down the stairs.

To overcome this disadvantage, the present invention includes a shock absorbing means for permitting the wheel chair to "tip over" very gradually fro mits horizontal position to its inclined position. This shock absorbing means is shown in FIG. 3 and it is shown in greater detail in FIG. 4.

Figure 3:
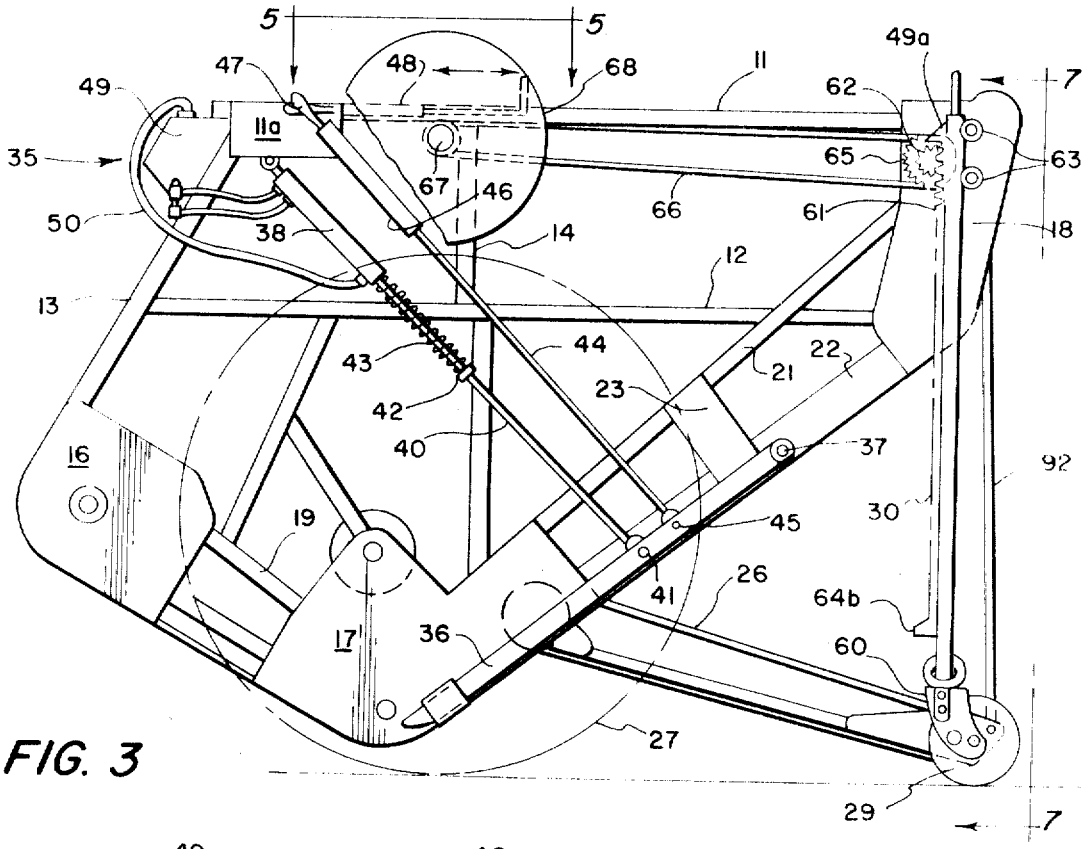
FIG. 3 is a side elevational view similar to FIGS. 1 and 2 and showing additional features of the wheel chair.
Figure 4:
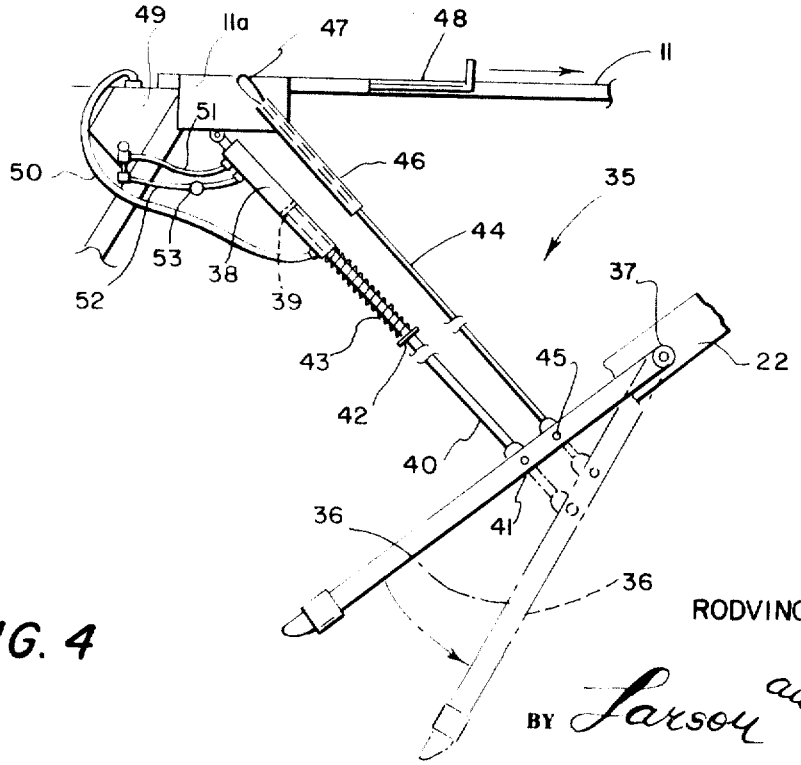
FIG. 4 is a detailed view of the portion of FIG. 3 associated with the shock-absorbing mechanism.

Referring now to FIGS. 3 and 4, there is shown a shock absorber assembly 35 comprising a hinged bar 36 mounted for pivotal movement about pivot pin 37 which is in turn connected to guide rail 22. The assembly includes a cylinder 38 containing actuating fluid, preferably hydraulic fluid. This cylinder is fixed to the plate 11a and includes the said hydraulic fluid above and below a piston 39. A piston rod 40 is connected to the piston 39 and extends down to the bar 36, to which it is pivotally attached at point 41. The rod 40 includes a collar 42 fixed thereto and a spring 43 acting between the cylinder 38 and the collar 42 and normally urging the hinged bar 36 to pivot counterclockwise about the pivot pin 37. The assembly also includes a retaining rod 44 pivotally connected at its lower end to bar 36 and extending through a guide sleeve 44 (which guide sleeve is attached to the arm rest bar 11). This rod 44 contains a through opening 47 near its upper end, into which opening a tapered slidable lock bolt is slid to hold the rod 44 in its upper position and hence also to hold the bar 36 in its upper (or clockwise) position against the force of spring 43.

The shock absorber assembly 35 also includes a hydraulic tank 49 having an unrestricted fluid passage 50 leading to the lower end of the cylinder 38. The tank is connected to the upper end of cylinder 38 through a restricted passage 51 and through a second passage 52, parallel to the passage 51, including a one-way valve 53 permitting fluid to flow from the tank 49 to the cylinder 38.

The shock absorber assembly 35 operates as follows. As the operator edges over the upper edge of the incline, the elements are in the position as shown in FIG. 3 and as shown in solid lines in FIG. 4. After the operator has edged past the upper edge of the incline a sufficient amount, but before the center of gravity has passed over the upper edge, the operator withdraws the lock bolt 48 by pulling it rearwardly, thereby releasing the rod 44 and permitting the bar 36 to more downwardly (counterclockwise as shown in the figures) under the force of spring 43 until the bar engages the incline. This may be, for example, the dotted line position shown in FIG. 4. During this downward movement of the various elements, any fluid beneath piston 39 is permitted to flow freely through line 50 to the tank 49. The operator then continues to edge forward until the center of gravity passes over the edge. At this point, as with the previous arrangement, the wheel chair starts to tip over from the level surface onto the inclined surface. Now, however, this movement of the chair to the inclined position can occur only by pushing the bar 36 upwardly, and hence pushing the piston 39 upwardly into the cylinder 38. However, upward movement of the pistoin 39 is resisted by the fluid in the upper part of chamber 38, which fluid can escape only slowly through restricted passage 51. This restricted escape of the fluid constitutes the shock absorbing mechanism. Of course, during downward movement of the piston 39 fluid is permitted to flow freely from the tank 49 to the upper part of cylinder 38 through line 52 and one-way valve 53. Finally, when the chair has reached the fully inclined position, the bar 36, and hence the rods 40 and 44 will have been pushed upwardly (clockwise) to their uppermost position, at which time the operator simply moves the sliding lock bolt 48 forwardly through aperture 47 to lock the shock absorber mechanism in its retracted position.

Figure 5:
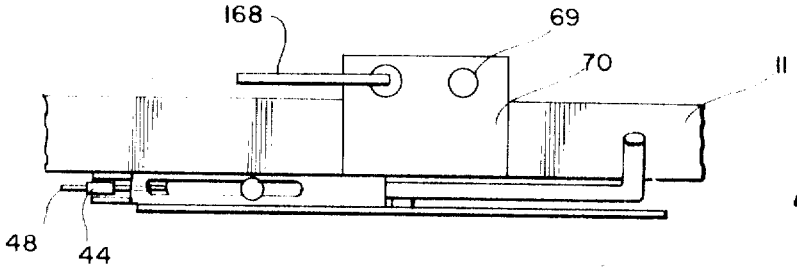
FIG. 5 is a partial plan view taken along line 5—5 of FIG. 3.

The elements 44 and 48 are shown also in FIG. 5.

The rear leg and the rear wheel of the wheel chair, as shown for example in FIG. 3, operate in substantially the same manner as the corresponding parts in my said previous patent. However, there are some modifications. The front of the rear leg 30 is formed as a toothed rack 61 which meshes with the teeth of a spur gear 62 which is mounted for rotation about a pin attached to the rear plates 18. A sprocket wheel 65 is mounted coaxially with the spur gear 62 for rotation therewith. A chain loop 66 engages the sprocket 65 at one end and a second sprocket 67 at its other end. This other sprocket is mounted on frame part 11b. A hand wheel 68 convenient to the operator is fixed for rotation with the sprocket 67 such that by turning the hand wheel 68 the operator turns the sprocket 67, and thus turns the chain 66 and the sprocket 65 to raise and lower the rear leg 30. This rear leg is supported on the side opposite from spur gears 62 by a pair of H-shaped rollers 63. See FIGS. 3 and 7. Downward and upward vertical movement of the rear leg 30 is limited by engagement of stop members 64a and 64b on the rear leg 30 with the spur gear 62. In FIG. 3, the rear leg 30 is shown in its lowermost position whereat the stop member 64a engages the spur gear 62.

FIG. 3 also shows a portion of the crawler assembly including the crawler belt 26. The purpose of this assembly will be explained in greater detail below. However, for the present it should be noted that the lowermost point of this assembly is slightly above the bottom of wheel 29, for example, one-fourth of an inch. This crawler assembly must retain its orientation relative to wheel 29 and it must move upwardly as the wheel 29 moves upwardly so that the portion of the endless belt 26 adjacent lower guide rail 22 can ride on an inclined surface. For this purpose, the rear frame members of the crawler assembly are rigidly attached to the rear leg 30 by means of a rod 92 which is rigidly attached at its upper end to a portion of leg 30 which bends over the rear plates 18. See FIGS. 3, 7 and 9.

As explained in detail in my previous patent, there is associated with sprocket member 67 a clutch arrangement for permitting movement of the hand wheel 68 in only one direction at a time. This clutch 69 is mounted on the opposite side of plate 11b from sprocket 67. See FIG. 9. The upper part of this clutch mechanism 69 is attached to a plate 70 which is in turn attached to the arm rest bar 11. See FIG. 5.

When approaching a flight of stairs, or any other incline in preparation for an ascent or a descent, it is necessary that the direction of the rear wheels be locked to permit only forward and reverse movement while preventing turning movement. To achieve this result, the present invention now includes an automatic rear wheel castor locking device. Referring to FIGS. 3 and 6–8 there is provided an inclined cam surface 75 circumventing the rear wheel 30 and connected to the castor by a connecting piece 76. This inclined circular cam includes a low point 77. Meanwhile, a cooperating rod 78 is mounted on the rear leg 30 through guides 80. A spring 81 acting between the guide 80 and a collar 82 fixed on the rod 78 urges the rod 78 downwardly. Meanwhile, any convenient holding means is employed to hold the rod 78 in its position against the action of spring 81. For locking the casters, the rods 78 are simply released and permitted to move downwardly. At this time the lower tip 79 of the rod 78 engages the circular cam 75 and exerts a downward force thereon thereby turning the cam plate 75 and hence also the wheel 29 until the low point 77 is positioned directly below and in contact with the said tip 79. At this time the rear wheel is correctly oriented for commencing an assent or a descent of an inclined surface.

Figure 7:
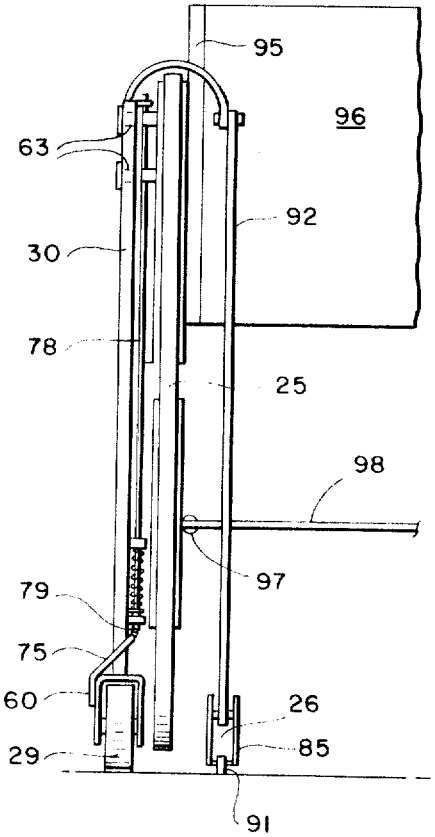
FIG. 7 is a rear elevational view taken along line 7—7 of FIG. 3.
Figure 6:
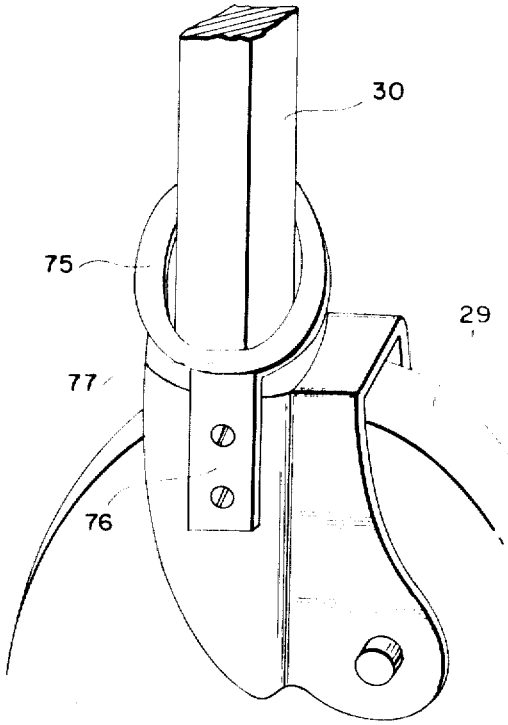
FIG. 6 is an enlarged, perspective view of the rear wheel of FIG. 3.
Figure 8:
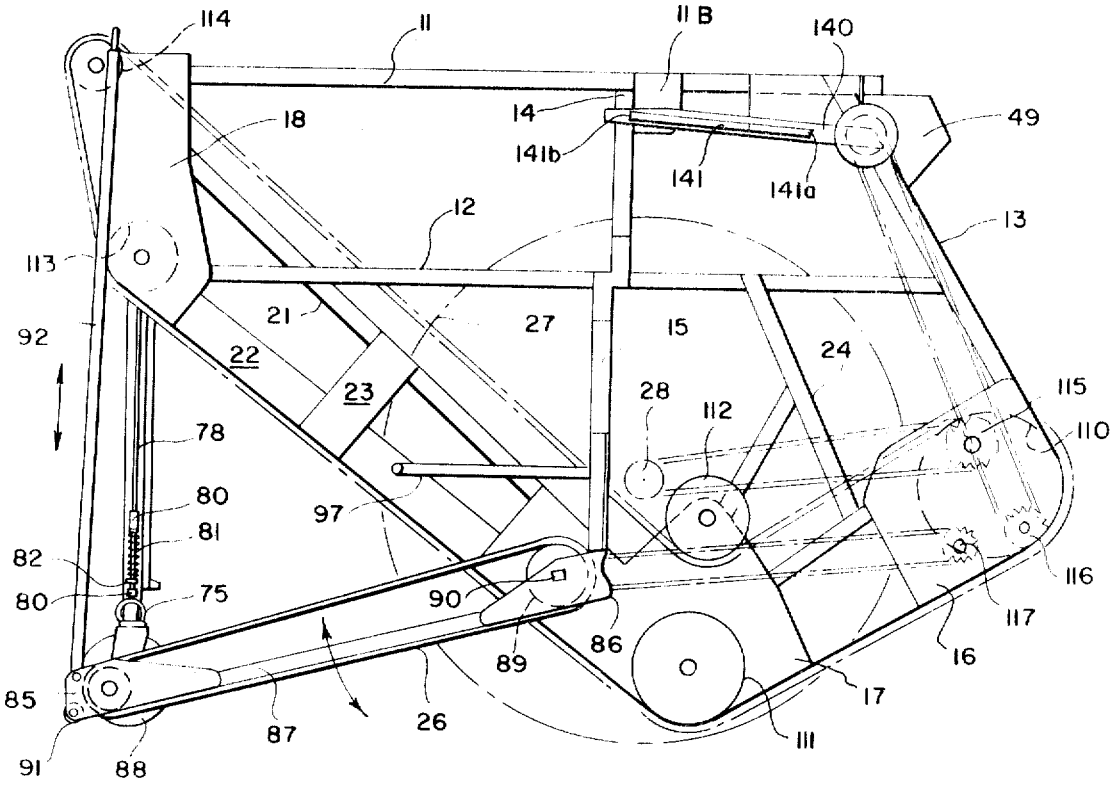
FIG. 8 shows the side of the left main frame opposite from that shown in FIGS. 1–3, emphasizing the fixed frame parts and wherein the front, central and rear plates facing the viewer have been removed to show internal parts.
Figure 9:
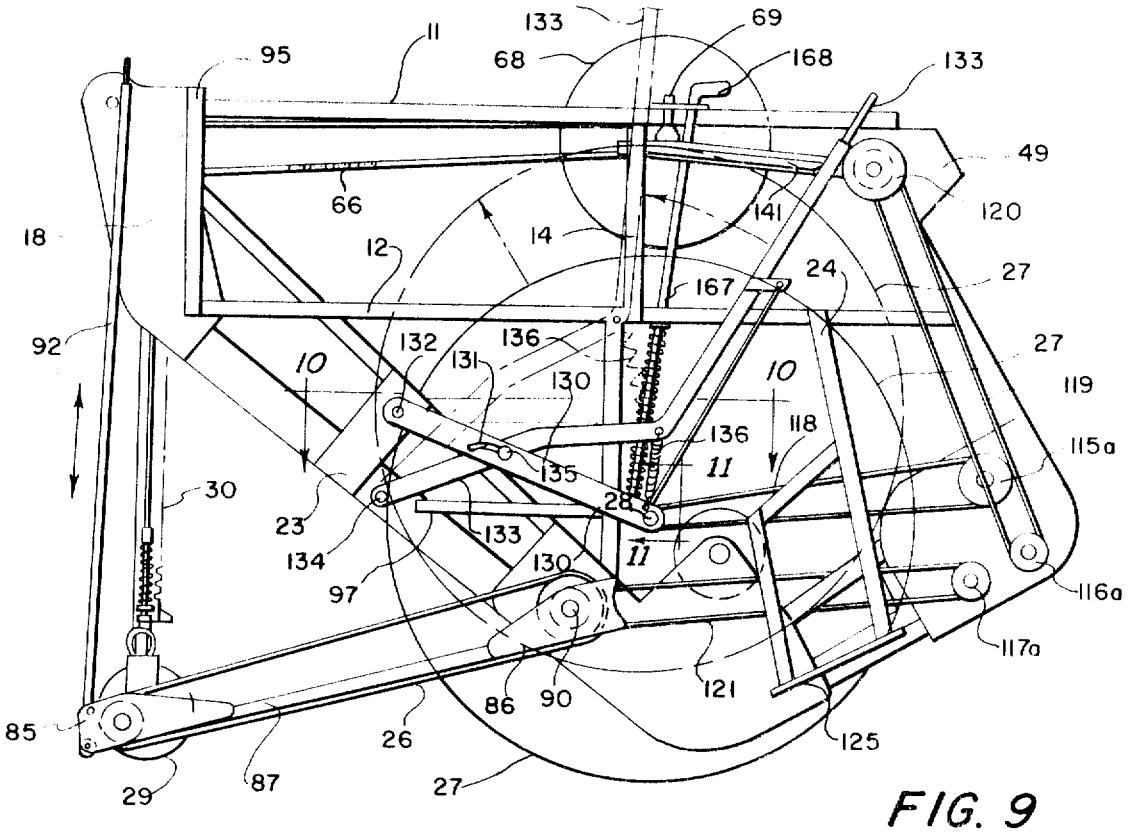
FIG. 9 is a side elevational view similar to FIG. 8 but showing additional structural features of the invention.

FIGS. 7, 8 and 9 also show the structure for holding the back and the seat which support the operator. A vertical bar 95 (see FIGS. 7 and 9) is rigidly attached to the rear plates 18. A flexible material 96 constituting the back of the chair is attached to and extends across from this bar 95. Meanwhile, the seat 98 is attached to a bar 97 (see FIGS. 7 and 8) and is movable about the axis of bar 97 for folding the seat.

Another feature of the present invention is the provision of a crawler belt assembly for permitting the wheel chair to negotiate obstacles and inclinations which are too small to be negotiated by the main endless belt 25 and too large to simply roll directly over. The most frequent example of this type of obstacle is a curb. The crawler assembly, including the crawler endless belt 26 is provided for this purpose. See FIGS. 3 and 7–9. Referring in particular to FIGS. 8 and 9, this crawler assembly includes a pair of rear crawler plates 85 and a pair of front crawler plates 86, the two pairs of plates being connected to each other by means of guide bar 87. In FIG. 8, the plates 85 and 86 closest to the viewer have been removed to expose the area between these plates. The crawler belt 26 is a timing belt of the same construction of the main belt (as described in detail in my previous patent). This crawler belt is mounted for rotation about a driving wheel 89 having teeth which engage grooves in belt 26. An idler pulley 88 is provided between the rear plates 85. The drive pulley 89 has a square central opening which is positively engaged by a square portion of shaft 90. On each side of the drive belt 89, the shaft 90 is circular and it extends through the two plates 86. On the side of plates 86 opposite from that shown in FIG. 9, the shaft 90 has a chain sprocket fixed thereon for rotation therewith. Beyond this point the shaft 90 passes through the lower guiderail 22. A chain 121, which will be explained in greater detail below (see FIG. 9), engages the sprocket of the shaft 90 to rotate the shaft 90, and hence the drive pulley 89 and the crawler 26 whenever the main endless belt 25 is moved. At the rear end of the crawler assembly there is provided a small wheel 91 which keeps the rear wheels from digging in and turning sideways as the wheel chair is climbing curbs.

Thus, in operation, one would ascend a curb by first wheeling the chair up to the curb, and then retracting the wheels and operating the belts. The portion of the main belt adjacent guide rail 20 would first engage the curb and climb until the lowermost point of the main belt cleared the edge of the curb. Shortly thereafter, the lower portion of the crawler belt 26 adjacent the bar 27 would engage the curb, and upon further movement of the two belts, the wheel chair would complete its ascent of a curb. To descend a curb, the operator goes front end first. In this case, whether the main wheels are retracted or in the down position, after main part of the wheel chair went over the curb, the latter part would be caught by the engagement of crawler treads 26 with the edge of the curb.

When the rear wheels are retracted (raised) the entire crawler assembly pivots about the round portion of shaft 30 pivotally engaged in guide rail 22, such that in the fully raised position of the rear legs and rear wheels, the entire crawler assembly is located above that portion of the belt below guide rail 22 so that the main endless belt can be used for ascending or descending a flight of stairs.

FIGS. 8 and 9 show the driving arrangement of the preferred embodiment of the invention. Referring first to FIG. 8, which shows the wheel chair with the sideplates removed, the drive arrangement includes a driving pulley 110 having teeth formed on its external surface for engaging the grooves in the main endless belt 25 which is a timing belt as described in my previous patent. The path of the belt 25 is established by means of idler pulley 111 and 112 connected to the central plates 17 and the idler pulleys 113 and 114 connected to the rear plates 18. This driving pulley 110 is an internally toothed ring gear having a plurality of spur gears 115, 116 and 117 in engagement therewith. Each of these spur gears 115–117 are mounted on shafts extending through the sideplate 17 as shown in FIG. 9. Chain sprockets 115a, 116a and 117a are mounted on the shafts of gears 115, 116 and 117, respectively, for rotation with said shafts. The sprocket 115a is engaged by a chain 118 which, at its other end, is engaged by a sprocket which is selectively engageable with the shaft of main wheel 27 for rotation therewith. Therefore, by actuation of a simple clutch mechanism (to be described in greater detail below), turning of the wheel 27 turns the chain 118, and hence the sprocket 115a. This in turn turns the member 110 which drives the main belt 25. The sprocket 117a, turned by its connection with spur gear 117, then acts as a power takeoff mechanism for turning chain 121, shaft 90 and hence the crawler thread 26. Meanwhile, the sprocket 116a, which is engaged through chain 119 to a sprocket rigidly attached to wheel 120, acts as a clutch mechanism for permitting rotation of the drive wheel 110, and hence of the endless belt 25, in either the forward or the reverse direction.

This improved drive arrangement has a number of advantages. First of all, the ring gear 110 provides a reduction of three-to-one for more power. Secondly, the provision of elements 117 and 117a, in combination with the ring gear, provide a compact source for power-takeoff for the crawler. This is particularly important since it has been found that the crawler must be driven positively in order to work effectively. The spur gear 116a has a three-eighth inch hole in its shaft and receives a standard ratchet such as made by S-K. This clutch may be of the type described in my previous patent. The ratchet wrench is drilled and the wrench is then bolted to a bolt coming out of the frame assembly approximately in the center between the spur gears. That portion of the wrench which operates the ratchet control has the sprocket 116a welded to it, from which the chain 119 extends to a sprocket on the wheel 120. By turning this wheel 120 the proper amount, the operator sets the drive in forward or reverse.

Another feature of the invention is the improved lever and cam arrangement for retracting and lowering the front wheels. This structure is shown in detail in FIG. 9 and portions are further illustrated in FIG. 10. The shaft 28 of the main wheel 27 passes through a swing plate 130 which is pivotally connected at the end opposite from shaft 28 on a pivot pin 132 which is in turn fixed on the connecting piece 23. This swing plate includes an elongated curved slot 131. In addition, the arrangement includes an elongated bent lever arm 133 pivotally connected at one end by means of pin 134 in the guide rail 22 and having fixed thereto a pin 135 which engages the slot 131.

As shown in FIG. 8 as well as FIG. 9, a fixed plate 140 is located near the upper part of the frame, this plate being rigidly fixed to vertical bars 13 and 14. A raised member 141 is fixed to the plate 140 and includes abrupt ends 141a and 141b. Referring now to FIG. 9, the elements are shown in solid lines in the wheel down position. In this position there is a general force tending to urge the lever 133 counterclockwise about its pivot point 134. This motion is resisted by engagement of the upper end of lever arm 133 with the end 141a of the raised cam surface 141. To retract (raise) the wheels, the operator grasps the upper end of lever arm 133 and pulls the arm rearwardly (counterclockwise). By this movement, the pin 135, acting in the slot 131 turns the plate 130 counter-clockwise about its axis 132 and thereby raises the wheels to a level above the low point of the track 25. In this retracted position, which is shown in dotted lines in FIG. 9, the lever arm 133 rests against the opposite end 141b of the cam 141. The lever 133 is held against edge 141b by the weight of the wheels acting through plate 130 on the pin 135, and also by spring 136 acting between the plate 130 and the lever arm 133. This system has the advantage that the slot is so engineered that half of the stroke of the lever arm moves the plate 130 a very small amount (that distance which brings the wheel down past the frame) and the other half stroke gives a long travel to the swing plate so that the wheel can clear the belt line so that the chair can climb the stairs.

Normally the belts are in driving engagement with the wheel 27 so that by turning the wheel (when the wheel is in its retracted position), the operator moves the belts. However, when the wheels are down for normal use on level ground, this driving engagement between the wheels 27 and the belt causes an unnecessary drag which must be overcome in order to move the chair. Consequently, in accordance with another feature of the invention, there is provided a simple clutch for selectively disengaging the belts from the main wheels for normal use of the wheel chair on level ground. This simple clutch mechanism is located on the shaft 28 between the plate 130 and the wheel 27, and is shown in detail in FIGS. 10 and 11.

Figure 11:
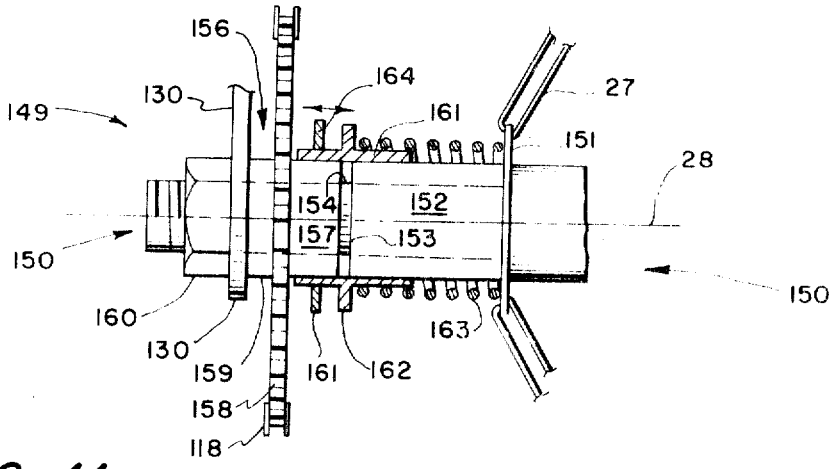
FIG. 11 is a front elevational view of the clutch mechanism of FIG. 10, and is taken along line 11—11 of FIG. 9.

Referring to these figures, the positive clutch 149 includes a shaft assembly 150 rotatable with the wheel 27. This shaft assembly includes a flat annular plate 151, a hexagon-shaped portion 152 ending at shoulder 153 and a reduced diameter circular portion shown at 154. This reduced diameter circular portion 154 extends outwardly to the left (as shown in FIG. 11) to the very end except for the outermost portion which includes a threaded part 155 which is engaged by a nut 160 for a purpose to be described below. Mounted on this reduced portion 54 for rotation relative thereto, there is provided a sprocket member 156 including a first side 157 which has a hexagon shape identical to the shape of hexagon portion 152. The central part of this member 156 is a sprocket 158 which is engaged by chain 118. The side of this element 156 opposite from the hexagon side 157 is simply a smooth rounded portion 159. Surrounding the two hexagon portions 152 and 157 is a clutch member 161, the internal surface of which is shaped so as to positively engage the surfaces 152 and 157 for rotation therewith. For example, the internal surface of element 161 may be a polygon of either six sides or 12 sides. In the position as shown, which represents the normal position of the clutch, the clutch member 161 engages both 152 and 157 and hence transfers torque from element 152 to the element 157. Thus, in this position, any rotation of the wheel 127 will cause rotation of the element 156 and hence also of the chain 118, the sprocket 115a, the spur gear 115, the drive wheel 110 and hence the belts 25 and 26. A spring 153 normally urges the element 161 into this drive position.

To disengage the clutch the element 164, which is visible above and below the element 161 in FIG. 11, is moved to the right (as shown in FIG. 11). In this manner the element 164 acts as a pressure plate against an annular flange 162 on the element 161 thereby urging this element 161 to the right against the action of spring 163 until no part of the element 161 surrounds the part 157 of the element 156. In this condition the wheel 27 may be rotated without causing movement of the belts 25 and 26.

Figure 10:
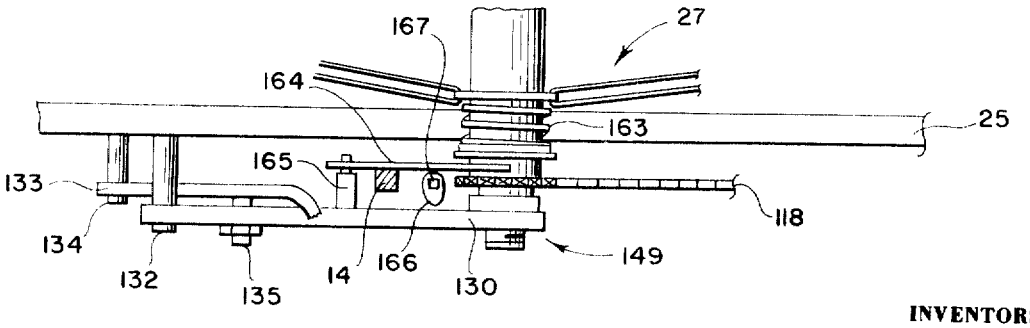
FIG. 10 is a detailed plan view of a clutch mechanism taken along line 10—10 of FIG. 9.

This pressure plate 164, which is shown also in FIG. 10, is connected by connecting plate 165 to the element 130. Between the plates 164 and 130, there is provided an eccentric cam element 166. By turning this cam element 166, the larger part thereof acts against the plate 164, which of course would be resiliently mounted relative to plate 165 and 130, urging plate 164 towards the wheel 27. As indicated above, this causes disengagement of the hexagon portion 157 from the hexagon portion 152, and hence disengagement of the belts 25 and 26 from the wheel 27. Referring to FIGS. 9 and 10, there may be provided a square shaft 167 passing from the plate 70 mounted on the arm rest 11 (see FIG. 5) down to and through the cam 166 In this manner, the operator can simply turn the lever 168 (see FIGS. 5 and 9) and thereby turn the cam 66 to operate the clutch. The shaft 167 passes slidably through the cam 166 which in turn is vertically fixed relative to the plates 130 and 164. In this manner, the cam 166 moves upwardly and downwardly with the plate 130, the square shaft 167 sliding vertically relative to the cam 166 during this vertical movement.

Although the invention has been described in considerable detail with respect to a preferred embodiment thereof, it should be apparent that the invention is capable of numerous modifications and variations apparent to those skilled in the art without departing from the spirit and scope of the invention.

I claim:

1. A wheel chair capable of travelling on inclined irregular surfaces comprising a pair of side frames defining a seat therebetween; each of said side frames comprising: guide means, and endless belt on said guide means and having an upper run and a lower run, the lower run of said endless belt defining a generally V-shaped path from a front end in front of the seat to a rear end behind the seat, a main wheel rotatably mounted on the side frame and movable at least between a raised position above the said lower run and a lower position whereat the bottom of the wheel is positioned below the said lower run for engaging the ground, and a rear leg having a rear wheel movable at least between a raised position above the lower run and a lower position sufficiently far below the lower run such that the chair is upright when the rear wheel is lowered, and wherein, when the main and rear wheels are in their raised positions, the rear part of the V-shaped lower run engages the ground, means for driving the endless belt about its guide means, a hydraulic shock absorber means operatively associated with said side frame for movement between a raised position above the level of the lower run and a lower position below the lower run, said shock absorber means comprising a bar extending forwardly along the rear part of the V-shaped lower run from a pivot connection with the side frame, such that when the wheel chair is supported on the said rear part of the lower run for movement along a surface onto a downward incline, said bar is pivotable about said pivot connection to its lower position to engage the inclined surface before the chair tips over a sufficient amount for the said rear part of the lower run to engage the incline, a retaining means for holding the bar in its raised position and a spring means for urging the bar to its lower position when the retaining means is released, a damping mechanism permitting movement of the bar downwardly away from the lower run under the action of the spring means and restricting movement of the bar upwardly to its raised position, said damping mechanism including a hydraulic piston and cylinder unit operatively connected to the side frame and to the bar, a fluid reservoir, an open passage from one end of the cylinder to the reservoir to permit free passage of fluid therein as the bar moves to its lower position, and two fluid lines leading from the reservoir to the other end of the cylinder, one of said two lines being a restricted passage and the other having a one-way valve permitting fluid to flow only from the reservoir to the cylinder, whereby when the bar is lowered, liquid flows from the reservoir through the one-way valve to the cylinder, and wherein during raising of the bar, liquid flows through the restricted passage to the reservoir.

2. A wheel chair according to claim 1 including a retaining rod means attached to the bar, and locking means attached to the side frame and operatively engageable with the retaining rod for releasably holding the bar in the raised position.

3. A wheel chair capable of travelling on inclined irregular surfaces comprising a pair of side frames defining a seat therebetween; each of said side frames comprising; guide means, an endless belt on said guide means and having an upper run and a lower run, the lower run of said endless belt defining a generally V-shaped path from a front end in front of the seat to a rear end behind the seat, a main wheel rotatably mounted on the said frame and movable in an arc at least between a raised position above the said lower run and a lower position whereat the bottom of the wheel is positioned below the said lower run of the endless belt for engaging the ground, and a rear leg having a rear wheel movable at least between a raised position above the lower run and a lower position sufficiently far below the lower run that the chair is upright when the rear wheel is lowered, and including a means for moving the main wheel to said raised and said lowered positions, comprising a swing plate pivotally connected at one end to the guide means and having rotatably connected to its forward end the shaft of the said main wheel, said plate being pivotable about said pivot connection for raising and lowering the main wheel, a slot in the rear part of the swing plate, a lever arm pivotably connected at its lower end to the guide means and extending upwardly, said lever arm including a pin engageable in the slot of the swing plate, the pin and slot being arranged such that movement of the lever arm in one direction about its pivot connection raises the main wheel and movement of the lever arm in the other direction about its pivot connection lowers the main wheel, the slot being shaped such that movement of the lever arm through one-half of its range of movement causes movement of the main wheel between its lower position and an intermediate position just clearing the lower run, and movement of the lever arm through the other half of its range of movement causes a larger movement of the main wheel from the intermediate position to the raised position.

4. A wheel chair according to claim 3 including a raised cam fixed to the side frame and having a forward end and a rear end, and wherein the said lever arm engages the forward and rear end of said raised cam to be locked in said lowered and raised positions, respectively.

5. A wheel chair according to claim 3 including a sprocket mounted on the shaft of the main wheel and a chain engaging said sprocket and drivingly engaged with the endless belt for driving the endless belt in response to movement of the main wheel.

6. A wheel chair according to claim 5 including a clutch means on the said shaft for selectively engaging and disengaging the main wheel with the said sprocket.

7. A wheel chair capable of travelling on inclined irregular surfaces comprising a pair of side frames defining a seat therebetween; each of said side frames comprising: guide means, an endless belt on said guide means and having an upper run and a lower run, the lower run of said endless belt defining a generally V-shaped path from a front end in front of the seat to a rear end behind the seat, a main wheel rotatably mounted on the side frame and movable at least between a raised position above the said lower run and a lower position whereat the bottom of the wheel is positioned below the said lower run for engaging the ground, and a rear leg having a rear wheel movable at least between a raised position above the lower run and a lower position sufficiently far below the lower run that the chair is upright when the rear wheel is lowered, and including a clutch means for selectively placing the endless belt into driving engagement with the main wheel said clutch means including a first member attached to the shaft of the main wheel for rotation therewith and a second member freely mounted on said shaft, a sprocket attached to the second member to receive a chain for driving the endless belt, and an annular clutch member having an internal surface shaped to drivingly engage said first and second members, said clutch member being slidable on said first and second members to a first position where it engages only one of said members and a second position where it drivingly engages both of said members for transferring torque from the first member to the second member, a spring acting on the flange to urge the clutch member to the said second position and a pressure plate arranged to act on the annular flange to urge the clutch member to the first position, and including a cam mounted to act on the pressure plate for urging the clutch member to the said first position, and a stem operatively connected to the cam for turning the same, said stem extending upwardly to the top of the side frame and accessible for rotation by the operator to operate the clutch.

8. A wheel chair capable of travelling on inclined irregular surfaces comprising a pair of side frames defining a seat therebetween; each of said side frames comprising; guide means, a primary endless belt on said guide means and having an upper run and a lower run, the lower run of said primary endless belt defining a generally V-shaped path from a front end in front of the seat to a rear end behind the seat, a main wheel rotatably mounted on the side frame and movable vertically, relative to the frame at least between a raised position above the said lower run and a lower position whereat the bottom of the wheel is positioned below the said lower run for engaging the ground, and a rear leg having a rear wheel movable vertically at least between a raised position completely above the lower run and a lower position sufficiently far below the lower run that the chair is upright when the rear wheel is lowered, and including a secondary belt assembly comprising a secondary guide means and a secondary endless belt mounted thereon and having an upper run and a lower run, said secondary guide means being connected at its forward end to the said primary guide means at a fixed point above the said lower run of the said primary endless belt and rotatable about said fixed point, the rear end of the secondary guide means being operatively connected to the rear leg for movement with the rear wheel between said raised and said lowered positions, the said secondary guide means being arranged such that when the rear wheel is in its lower position, the lower run of the secondary endless belt inclines forwardly upwardly at an incline about one-half that of the front part of the "V" of the primary endless belt, and such that when the rear wheel is fully raised, the secondary endless belt and the secondary guide means move about said fixed point and lie parallel to and above the lower run of the first said belt, and means for driving the secondary belt as the primary belt is driven.

9. A wheel chair according to claim 8 wherein the guide means includes a drive pulley selectively drivingly engageable with the said main wheel, and power takeoff means drivingly engaging the drive pulley of the primary guide means with the drive pulley of the secondary guide means so that the secondary endless belt is driven whenever the primary endless belt is driven.

10. A wheel chair as claimed in claim 8 wherein the rear leg is located outside of the side frame and the secondary guide means is located inside the side frame, the said connection between the rear leg and rear end of the secondary guide means including a bar extending upwardly from said secondary guide means and over the side frame fixedly connected to the upper end of the rear leg.

11. A wheel chair capable of travelling on inclined irregular surfaces comprising a pair of side frames defining a seat therebetween; each of said side frames comprising; guide means, an endless belt on said guide means and having an upper run and a lower run, the lower run of said endless belt defining a generally V-shaped path from a front end in front of the seat to a rear end behind the seat, a main wheel rotatably mounted on the side frame and movable at least between a raised position above the said lower run and a lower position whereat the bottom of the wheel is positioned below the said lower run for engaging the ground, and a rear leg having a rear wheel movable at least between a raised position above the lower run and a lower position sufficiently far below the lower run that the chair is upright when the rear wheel is lowered, and wherein said rear leg includes a means for automatically aligning the rear wheel in the reverse position, including a caster mounting on said rear wheel, an inclined cam attached to the upper section of the caster, presenting an upwardly facing surface completely surrounding the rear leg and having a low point, and a rod vertically slidable along the rear leg and arranged, through spring loading, to engage the cam plate and turn the rear wheel, if necessary, until the [rear wheel clears the endless belt when the leg is in the fully raised position] *low point of the cam is below said rod.*

*12. A wheel chair capable of travelling on inclined irregular surfaces comprising a pair of side frames defining a seat therebetween; each of said side frames comprising: guide means, and endless belt on said guide means and having an upper run and a lower run, the lower run of said endless belt defining a generally U-shaped path from a front end in front of the seat to a rear end behind the seat. a main wheel rotatably mounted on the side frame, and a rear leg having a rear wheel movable at least between a raised position above the lower run and a lower position sufficiently far below the lower run such that the chair is upright when the rear wheel is lowered, and wherein, when the rear wheel is in its raised position, the rear part of the U-shaped lower run engages the ground, means for driving the endless belt about its guide means, a hydraulic shock absorber means operatively associated with said side frame for movement between a raised position above the level of the lower run and a lower position below the lower run said shock absorber means comprising a bar extending forwardly along the rear part of the U-shaped lower run from a pivot connection with the side frame, such that when the wheel chair is supported on the said rear part of the lower run for movement along a surface onto a downward incline, said bar is pivotable about said pivot connection to its lower position to engage the inclined surface before the chair tips over a sufficient amount for the said rear part of the lower run to engage the incline, a retaining means for holding the bar in its raised position and a spring means for urging the bar to its lower position when the retaining means is released, a damping mechanism operatively associated with the bar, said mechanism permitting movement of the bar downwardly away from the lower run under the action of the spring means and restricting movement of the bar upwardly to its raised position, said damping mechanism including a hydraulic piston and cylinder unit operatively connected to the side frame and to the bar, a fluid reservoir, an open passage from one end of the cylinder to the reservoir to permit free passage of fluid therein as the bar moves to its lower position, and two fluid lines leading from the reservoir to the other end of the cylinder, one of said two lines being a restricted passage and the other having a one-way valve permitting fluid to flow ony from the reservoir to the cylinder, whereby when the bar is lowered, liquid flows from the reservoir through the one-way valve to the cylinder, and wherein during raising of the bar, liquid flows through the restricted passage to the reservoir.*

*13. A wheel chair according to claim 12 including a retaining rod means attached to the bar, and locking means attached to the side frame and operatively engageable with the retaining rod for releasably holding the bar in the raised position.*

*14. A wheel chair capable of travelling on inclined irregular surfaces comprising a pair of side frame defining a seat therebetween; each of said side frames comprising; guide means, a primary endless belt on said guide means and having an upper run and a lower run, the lower run of said primary endless belt defining a generally U-shaped path from a front end in front of the seat to a rear end behind the seat, a main wheel rotatably mounted on the side frame, and a rear leg having a rear wheel movable vertically at least between a raised position completely above the lower run and a lower position sufficiently far below the lower run that the chair is upright when the rear wheel is lowered, and including a secondary belt assembly comprising a secondary guide means and a secondary endless belt mounted thereon and having an upper run and a lower run, said secondary guide means being connected at its forward end to the said primary guide means at a fixed point above the said lower run of the said primary endless belt and rotatable about said fixed point, the rear end of the secondary guide means being operatively connected to the rear leg for movement with the rear wheel between said raised and said lowered positions, the said secondary guide means being arranged such that when the rear wheel is in its lower position, the lower run of the secondary endless belt inclines forwardly upwardly at an incline about one-half that of the front part of the "U" of the primary endless belt, and such that when the rear wheel is fully raised, the secondary endless belt and the secondary guide means move about said fixed point and lie parallel to and above the lower run of the first said belt, and means for driving the secondary belt as the primary belt is driven.*

*15. A wheel chair according to claim 14 wherein the guide means includes a drive pulley selectively drivingly engageable with the said main wheel, and power takeoff means drivingly engaging the drive pulley of the primary guide means with the drive pulley of the secondary guide means so that the secondary endless belt is driven whenever the primary belt is driven.*

*16. A wheel chair as claimed in claim 14 wherein the rear leg is located outside of the side frame and the secondary guide means is located inside the side frame, the said connection between the rear leg and rear end of the secondary guide means including a bar extending upwardly from said secondary guide means and over the side frame and fixedly connected to the upper end of the rear leg.*

*17. A wheel chair capable of travelling on inclined irregular surfaces comprising a pair of side frames defining a seat therebetween; each of said side frames comprising: guide means, an endless belt on said guide means and having an upper run and a lower run, the lower run of said endless belt defining a generally U-shaped path from a front end in front of the seat to a rear end behind the seat, a main wheel rotatably mounted on the side frame, and a rear leg having a rear wheel movable at least between a raised position above the lower run and a lower position sufficiently far below the lower run that the chair is upright when the rear wheel is lowered and wherein said rear leg includes a means for automatically aligning the rear wheel in the reverse position, including a caster mounting on said rear wheel, an inclined cam attached to the upper section of the caster, presenting an upwardly facing surface completely surrounding the rear leg and having a low point, and a rod vertically slidable along the rear leg and arranged, through spring loading, to engage the cam plate and turn the rear wheel, if necessary, until the low point of the cam is below the said rod.*

References Cited

The following references, cited by the Examiner, are of record in the patented file of this patent or the original patent.

UNITED STATES PATENTS

| | | | |
|---|---|---|---|
| 3,529,688 | 9/1970 | Bruce | 180—9.24 R |
| 3,068,950 | 12/1962 | Davidson | 180—9.24 R |
| 3,276,531 | 10/1966 | Hale | 180—9.24 R |
| 2,928,501 | 3/1960 | Ramirez | 280—5.22 X |
| 3,259,396 | 7/1966 | Zamotin | 280—5.22 |
| 1,480,021 | 1/1924 | Smith | 192—67 |
| 2,770,150 | 11/1956 | Culverwell | 192—67 X |

FOREIGN PATENTS

| | | | |
|---|---|---|---|
| 425,486 | 5/1967 | Switzerland | 280—5.22 |
| 1,046,444 | 10/1966 | Great Britain | 280—5.22 |

RICHARD J. JOHNSON, Primary Examiner